J. SNEDDON.
METHOD OF AND APPARATUS FOR MAKING BUTT-WELD PIPES.
APPLICATION FILED NOV. 22, 1918.

1,351,348.

Patented Aug. 31, 1920.
5 SHEETS—SHEET 2.

INVENTOR
John Sneddon

J. SNEDDON.
METHOD OF AND APPARATUS FOR MAKING BUTT-WELD PIPES.
APPLICATION FILED NOV. 22, 1918.
1,351,348.
Patented Aug. 31, 1920.
5 SHEETS—SHEET 4.
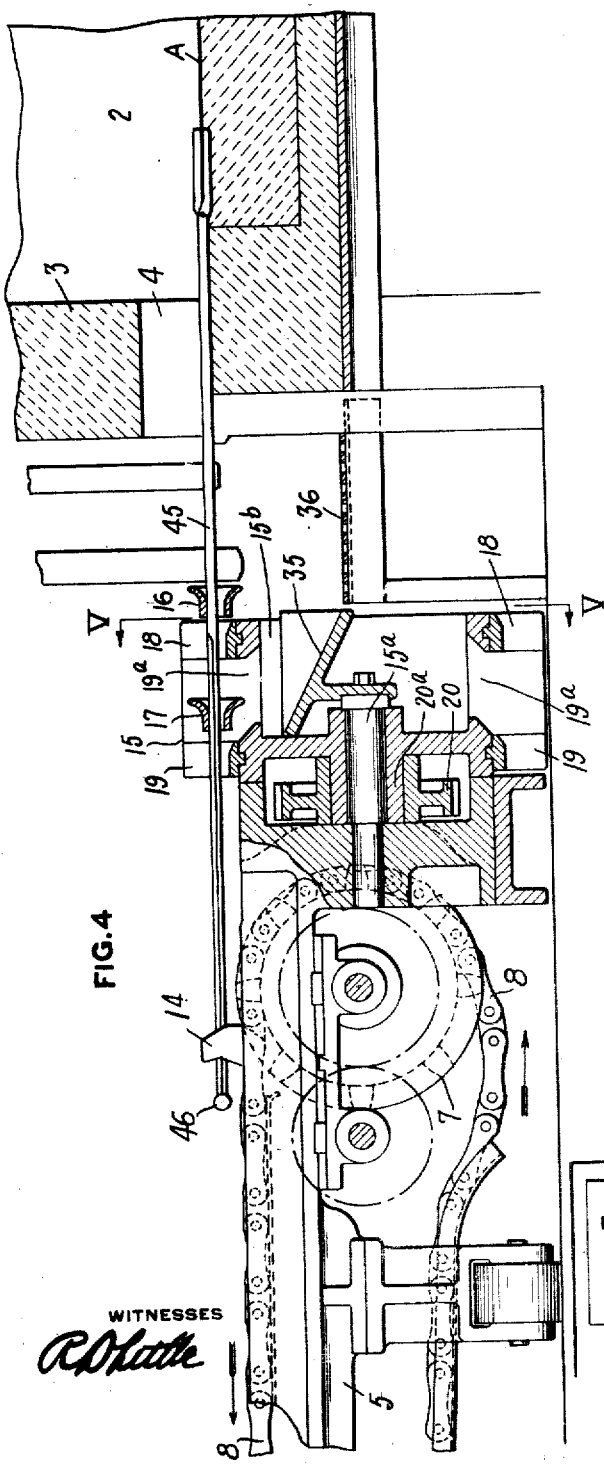
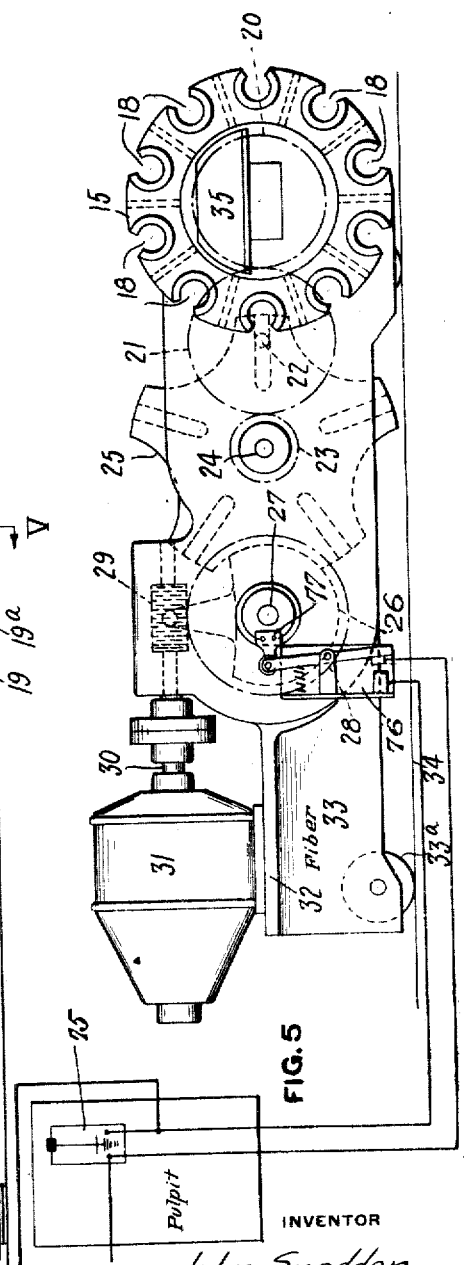
FIG. 4
FIG. 5
WITNESSES
INVENTOR
John Sneddon

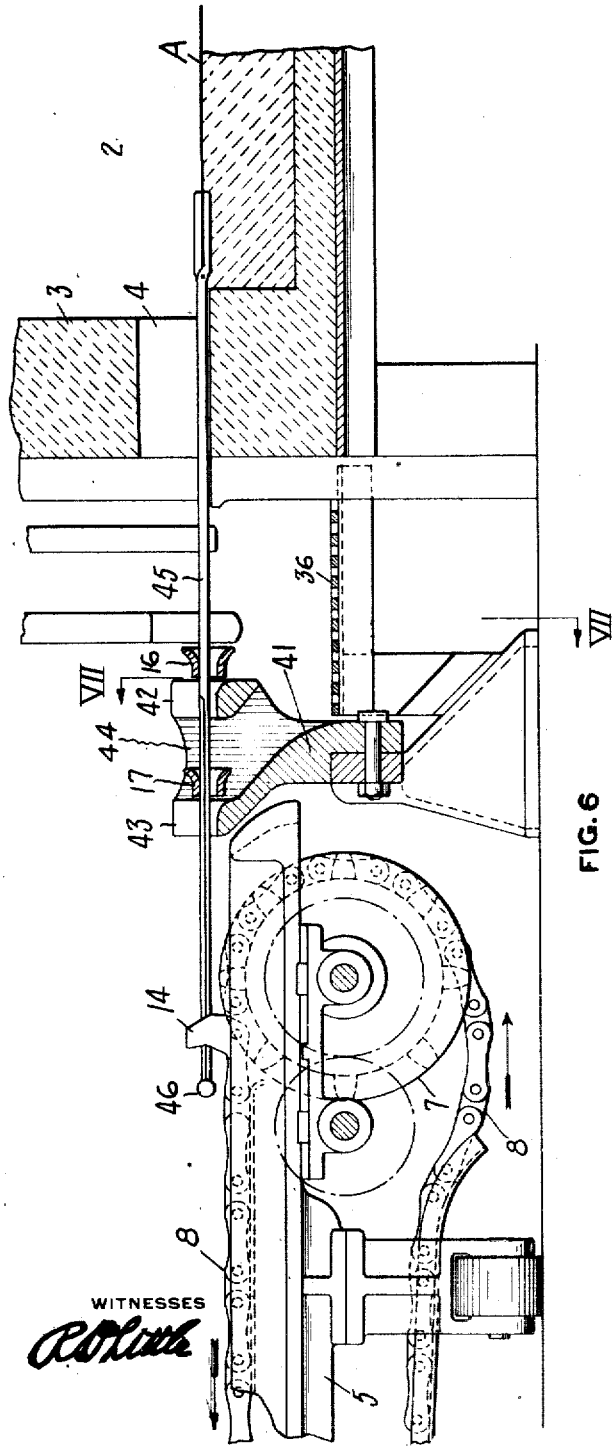
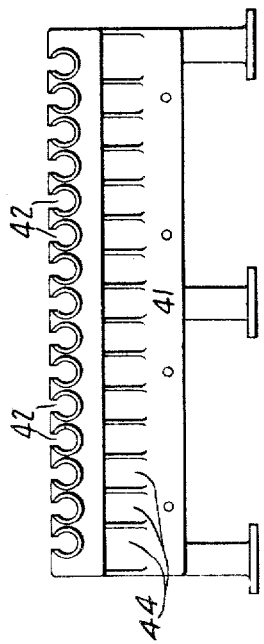

UNITED STATES PATENT OFFICE.

JOHN SNEDDON, OF McKEESPORT, PENNSYLVANIA, ASSIGNOR TO NATIONAL TUBE COMPANY, OF PITTSBURGH, PENNSYLVANIA, A CORPORATION OF NEW JERSEY.

METHOD OF AND APPARATUS FOR MAKING BUTT-WELD PIPES.

1,351,348.  Specification of Letters Patent.  Patented Aug. 31, 1920.

Application filed November 22, 1918. Serial No. 263,710.

*To all whom it may concern:*

Be it known that I, JOHN SNEDDON, a citizen of the United States, residing at McKeesport, in the county of Allegheny and State of Pennsylvania, have invented certain new and useful Improvements in Methods of and Apparatus for Making Butt-Weld Pipes, of which the following is a specification.

My invention relates to the manufacture of butt-weld pipes, in which long, narrow and relatively thin, flat strips of wrought metal, known as skelp and as pipe skelp, while highly heated, are formed into hollow cylindrical pipes. In making such pipes the skelp are successively drawn through a welding bell or plurality of bells, and are bent, and the abutting longitudinal edges of the bent skelp, being heated to a welding temperature, are forced into close contact with sufficient pressure to weld the abutting edges, the bending and welding operations being simultaneously effected in drawing the skelp through the welding bell.

In so far as I am aware, in making butt-weld pipe, it has been the universal practice heretofore to pull the pipe skelp through the welding bell on a line parallel with and in a vertical plane coincident with the line of travel of the endless draw chain of the draw bench, the welding bell or bells, being temporarily held in place against a stop on the furnace end of the draw bench.

It is necessary with such apparatus for each pipe to be entirely welded before welding of the next succeeding skelp can be commenced because the pipe being drawn interferes with the attachment of the next pipe skelp to the draw chain. The result is that the "welder" after attaching the tongs to a heated skelp and applying the welding bell or pair of bells thereto, must wait until welding of the preceding pipe is completed before the reins of the tongs on the next skelp can be placed in position for attachment to the traveling draw chain.

Stated another way, with the apparatus heretofore used the distance between successive points of attachment of the pipe tongs to the draw chain must be greater than the overall length of the pipe skelp and attached pipe tongs.

So that with all existent methods of making butt-weld pipes there is a momentary loss or waste of time between the successive skelp drawing operations because the drawing of each pipe skelp through the welding bell cannot be commenced until the welding of the preceding skelp is entirely completed and its rear end is pulled clear of the welding bell.

One object of my invention is to provide a novel method of making butt-weld pipes whereby a material increase in the number of pipes welded in a given time interval is made possible without increasing the speed at which the pipe skelp are drawn through the welding bells.

Another object of the invention is to provide a novel method of making butt-weld pipes wherein the welding operation is simultaneously carried out on a plurality of pipe skelp on a single draw bench.

Another object of my invention is to provide novel apparatus for making butt-weld pipe having improved means whereby delays between successive pipe drawing operations are materially lessened and the capacity of the pipe drawing apparatus is augmented.

A further object of this invention is to provide pipe drawing apparatus having improved means whereby the successive pipe are welded, and interference by a pipe skelp in process of welding with the movements of the welder in proceeding with the succeeding pipe drawing operation, is avoided and overcome.

A still further object of my invention is the provision of pipe drawing apparatus having the novel constructions, arrangements and combinations of parts shown in the drawings and to be fully described hereinafter and particularly pointed out in the appended claims.

Referring now to the drawings, forming part of this specification, Figure 1 is a plan showing the rear end or half of a draw bench adapted for use in making butt-weld pipe.

Fig. 4 is a sectional side elevation showing the front or furnace end of the draw bench of Fig. 2.

Fig. 5 is an end elevation on the line V—V of Fig. 4, showing details in the construction of the pipe drawing apparatus of Figs. 1, 3, and 4.

Fig. 6 is a sectional end elevation, similar to that of Fig. 4, showing details in the construction of the furnace end of the pipe drawing apparatus of Fig. 3.

Fig. 7 is an end elevation on the line VII—VII of Fig. 6 showing still further details in the construction of the apparatus of Figs. 3 and 6.

Fig. 8 is a sectional side elevation showing one form of forked dog adapted for use with the draw chain of the draw bench in practising my invention.

Fig. 9 is an end elevation of the forked dog of Fig. 8.

Figure 1:
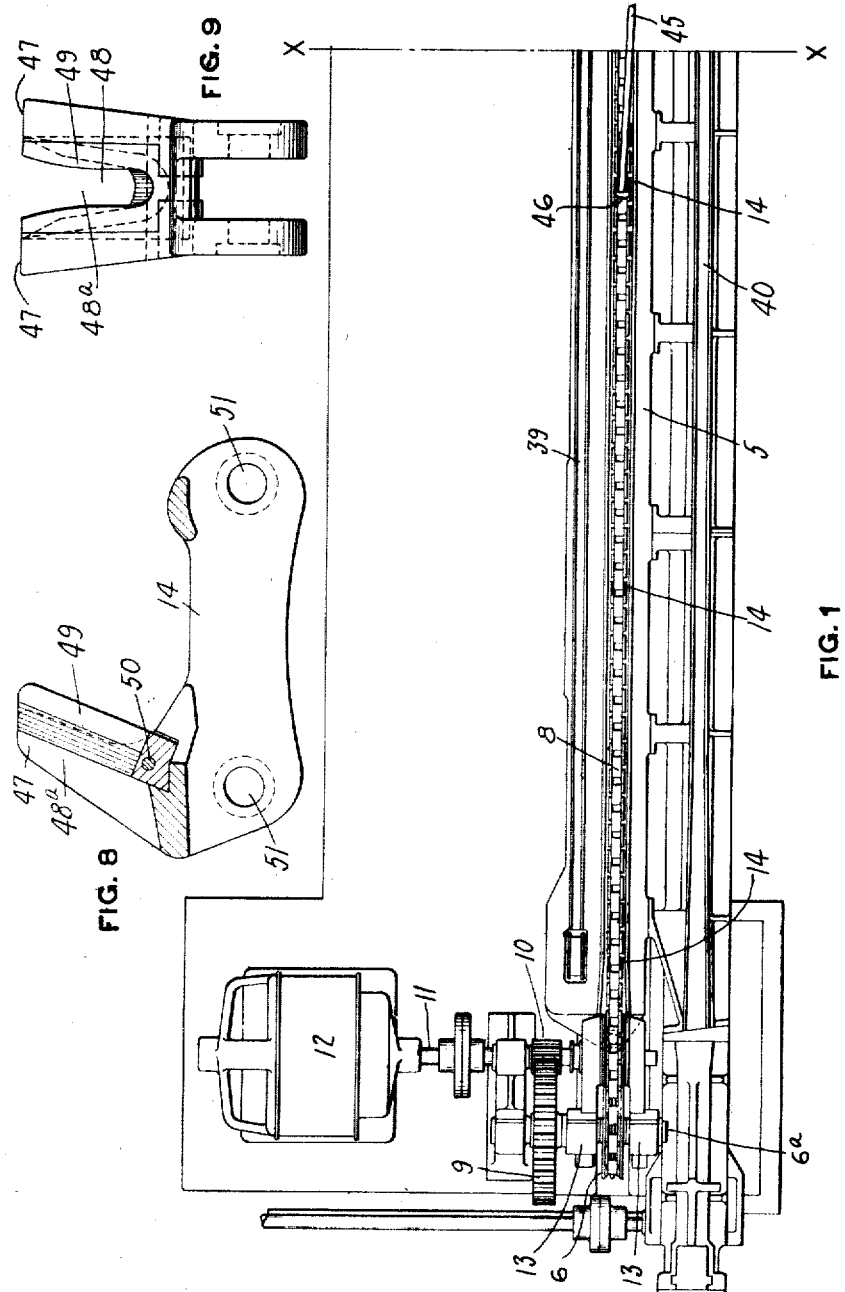

In the accompanying drawings the numeral 2 designates a skelp heating furnace, one end wall 3 of this furnace having an outlet or doorway 4 through which the pipe skelp are drawn in the pipe welding operations. Ordinarily the rear end wall of the furnace (not shown) will have a similar doorway through which the skelp are charged into the furnace to be heated.

Positioned in front of the discharge end 3 of the furnace is a draw bench 5, which extends horizontally in front of the furnace 2 and which is pivoted at its rear end so that the furnace end of the bench will swing from one side to the other of the doorway 4 in the end wall of the furnace, this arrangement enabling the furnace end of the draw bench to be moved into position in line with each successively drawn skelp and avoiding the necessity of shifting the position of the heated skelp in the furnace into a position in line with the draw bench.

With some sizes of skelp, however, it may be found desirable to shift the heated skelp sidewise within the furnace as well as moving the swinging draw bench.

The draw bench 5 which extends lengthwise away from the furnace is provided at one end with a chain driving sprocket wheel 6 and at the other with a chain driven or idler sprocket wheel 7 around which a constantly traveling endless draw chain 8 extends, this draw chain being actuated by the sprocket wheel 6 and that portion of the endless chain 8 supported on the upper surface of the draw bench moving away from the front or furnace end toward the rear end of the draw bench (in the direction indicated by the arrow in Figs. 4 and 6). The shaft 6ª for the sprocket wheel 6 is connected by reducing gears 9 and 10 to the armature shaft 11 of a variable speed electric driving motor 12, the motor being supported on a suitable foundation adjacent to the rear end of the draw bench. The length of the draw bench is so great and the arc of swinging movement of its front end is so small that the shaft 6ª for the sprocket wheel 6 also may be mounted in fixed bearing stands 13, 13 secured on a suitable foundation in the manner shown, instead of being on the rear end of the swinging draw bench. (See Fig. 1).

In the particular apparatus shown, the length of the endless draw chain 8 will be about eighty-five feet and the distance between the vertical centers of the sprocket wheels 6 and 7 of course will be slightly less than one-half the length of the draw chain.

In recent years it has been the practice to apply two forked hooks on the draw chain, the hooks being spaced at equidistant points in the length of the chain, these hooks being used to automatically engage with the button on the end of the tong reins and pull the tongs and a skelp in the grasp of the jaws of the tongs through a pair of welding bells, or a single bell, in welding the pipes, the tong reins being laid or placed immediately above and in alinement with the draw chain by the welder, in position to be engaged by the hooks after first attaching the tongs to a heated skelp and positioning the bells or bell on the tong reins.

In my improved apparatus the length of the draw chain 8 and draw bench 5 may be the same as heretofore, but a series of forked hooks 14 is provided on the draw chain, as many as ten hooks being used, so that on an endless chain having a length of eighty-five feet the hooks will be spaced approximately eight and one-half feet apart, or very much less than the average length of the welded pipes, which is over twenty feet and still less than the combined length of a pipe skelp and attached pipe tongs.

The forked hooks or dogs designated generally by the numeral 14, as will be seen in Figs. 8 and 9, are adapted to form a link in the endless draw chain. Projecting outwardly on one side at one end of these forked dogs are horns 47, 47, the horns being separated so as to form a longitudinal tapering slot 48 therebetween. The slot is provided with a removable face plate 49 which also is provided with a vertically tapering slot 48ª, the slots being in register and being adapted to receive the button end 46 of the tong reins in attaching the forked hooks to the tong reins for the pipe drawing operation. A pin 50 provides means for fastening the face plate in place on the dogs, and the edges of the face plate 49 are flared so as to tightly fit into the dovetail groove formed between the contiguous faces of the horns 47. The ends of the body portion of the hooks have counterbored rivet holes 51 therein by which the forked hooks are attached to the adjacent links of the endless draw chain.

Figure 2:
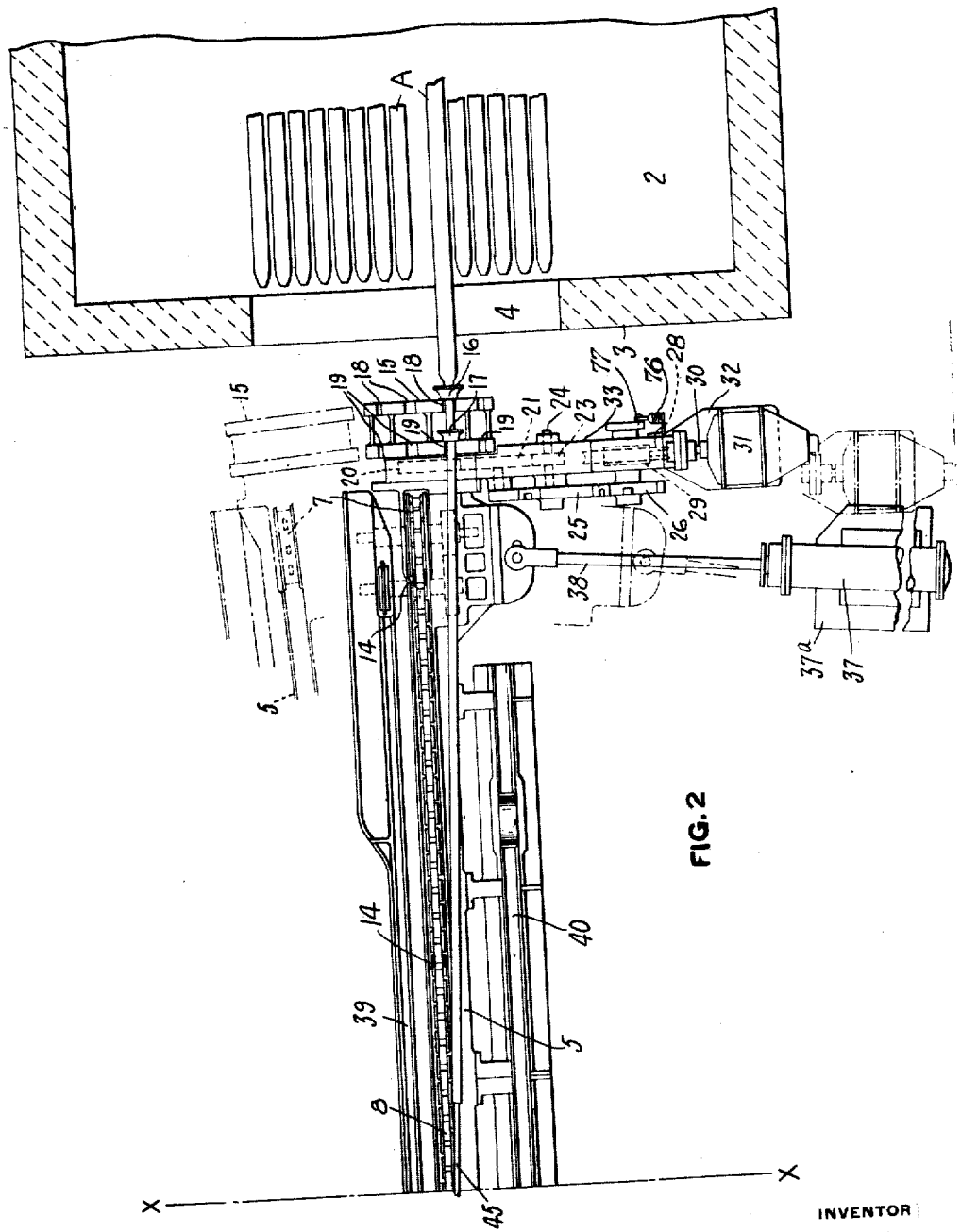
Fig. 2 is a plan showing the front or furnace end of a draw bench adapted for use in carrying out my invention. A complete plan will be had by joining Figs. 1 and 2 on the lines X—X of these figures.

In the construction shown in Figs. 1, 2, 4, and 5, the front or swinging end of the draw chain 8 is provided with a revolving turret 15, which is made in sections and is operatively mounted on the front end of the draw bench 5 so as to turn on a horizontal axis. The turret has two series of slots on its periphery to receive and temporarily hold the welding bells 16 and 17 in position during the pipe drawing operations. Each of the slots 18 of one series is in alinement with a slot 19 in the other series, as is shown in Figs. 2, 4, and 5. Radial slots 19ª connect the slots 19 with the counterbored recess 15ᵇ in the rotary turret. For many years but a single welding bell was used in welding the pipes, but the more recent and preferred practice is to use two bells for each pipe, the first engaged bell bending and welding the pipe skelp, and the second bell furthering the welding operation and slightly lessening the diameter of the pipe emerging from the first engaged bell.

The turret 15 which revolves on a horizontal shaft 15ª held in fixed position on the carriage 33 at the swinging end of the draw bench 5 has an integral hub 20ª on which a spur gear 20 is keyed or otherwise fastened. The spur gear 20 meshes with an idler spur gear 21 mounted on a horizontal shaft 22, and this idler gear 21 meshes with a spur pinion 23 which is keyed or otherwise fastened on a horizontal shaft 24 that is rotatably mounted on the end of the draw bench. One end of the pinion shaft 24 is provided with the intermittent gear 25 of a Geneva movement which is engaged by the finger gear 26 thereof. The finger gear is fastened on the horizontal worm-wheel shaft 27 mounted on the end of the draw bench, and the shaft 27 has a worm-wheel 28 thereon which is driven by a worm 29 connected to one end of the armature shaft 30 of the worm driving motor 31.

The motor 31 is mounted in operative position on a shelf or pad 32 on the carriage 33 at the front end of the draw bench 5, this carriage having anti-friction rollers 33ª which travel on a suitable track 34 at the floor level of the pipe mill and support the front or furnace end of the draw bench. Preferably a push button 75 and automatic switch 76 are connected into circuit with the motor 31, and the switch 76 is operated by a cam 77 on the shaft 27. The push button 75 and switch 76 are arranged so that a circuit is first made through the push button when it is temporarily closed by the pulpit operator and the motor thereby started. The motor will then rotate the shaft 27 and cam 77 so as to permit the switch 76 to close. The circuit will then be completed through the switch 76 and the operator then releases the push button. The motor then continues to operate until the cam 77 again engages the switch 76 when the motor circuit is automatically broken and the motor stopped, although this arrangement of electrical connections is not absolutely necessary.

The turret 15 is recessed or counterbored on one side, and secured in fixed position so as to extend into the counterbore 15ᵇ is an inclined shelf 35 bolted to the turret shaft 15ᵇ which does not rotate, this shelf receiving the bells 16 and 17 as they drop from the end of the welded pipes and discharging them on to the horizontal platform 36 which is located between the end of the draw bench 5 and adjacent front or discharge end of the welding furnace 2. (See Fig. 4).

A double-acting fluid pressure cylinder 37 mounted on a suitable foundation 37ª and having a piston rod 38 with its front end pivotally connected to the swinging end of the draw bench 5 is employed to move the draw bench in causing it to traverse or move across the width of the doorway 4 in the discharge end of the welding furnace.

The draw bench is provided on one side with a conveyer 39 for returning the pipe tongs from the rear end to the front or furnace end of the draw bench and on the other side with a pipe conveyer 40 by which the welded pipes are moved away from alongside the draw bench 5 into the bite of the sizing rolls (not shown).

In the modified construction shown in Figs. 1, 3, 6, and 7, the draw bench 5 is provided with a draw chain 8 arranged to extend around sprocket wheels 6 and 7 in the same manner as in the draw bench of Figs. 1, 2, 4, and 5. In this construction, however, the revolving turret is omitted and a stationary welding bell support or holder 41 is provided between the furnace 2 and the front end of the draw bench 5, at a point closely adjacent to the swinging end of the draw bench. The upper edge of this support is provided with a series of slots 42 and series of slots 43 for engaging with and holding the welding bells 16 and 17 used in the pipe drawing operations, the slots 42 and 43 being in alinement and two axially alined bells preferably being employed in drawing each pipe with this apparatus also. Vertical slots 44 lead from the slots 43 to the horizontal platform 36 located between the bell holder 41 and end of the furnace 2. (See Fig. 6.)

In using the apparatus of Figs. 1, 2, 4, and 5, to carry out the improved method forming part of this invention, the draw bench 5 is moved through the medium of the fluid pressure cylinder 37 until the pair of slots in the turret 15 in alinement with the traveling draw chain 8 is opposite the particular skelp to be drawn or welded. The welder then attaches the jaws of a pair of pipe tongs 45 to the end of a heated skelp A and after slipping a pair of the welding bells 16, 17 over the button end of the tong reins and fastening the tong reins in closed position with a link or shackle, lays the button end 46 of the tong reins in a position in line with and immediately above the traveling draw chain 8. In the meantime one of the series of hooks 14 on the endless traveling draw chain will engage with the button 46 on the end of the tong reins and will start to pull the tongs and attached pipe skelp through the welding bells. At the commencement of the pipe drawing operation the bells are moved against the abutment or stops formed by the slots 18 and 19 in the periphery of the turret. Immediately after the hook 14 has taken hold of the tong reins, the turret will be revolved through part of a revolution so as to move the welding bells 16, 17 through which the skelp is being drawn, out of alinement with the direction of travel of the draw chain, i. e.—into the position shown in Fig. 2. This movement of the turret 15 brings the next pair of slots 18, 19 in the turret into alinement with the draw chain. At the same time that the turret moves through part of a revolution the draw bench is swung slightly to bring the draw chain 8 and the pair of slots in the turret now opposite the draw chain into alinement with the next skelp A to be drawn.

The step by step rotary movement of the turret and swinging movement of the draw bench are controlled by another operator. This operator by closing the switch for starting the turret driving motor 31 and manipulating the valve controlling the supply of fluid pressure to the cylinder 37, simultaneously causes the turret to move on the draw bench and the draw bench to shift its position. The turret driving motor will, as has been stated, automatically stop when the next pair of slots 18 and 19 reaches a position in alinement with the draw chain.

The welder immediately after the chain hook 14 has engaged with the tong reins, proceeds to attach another pair of tongs 45 to the next skelp A and after fastening the tongs in closed or skelp gripping position and threading a pair of the welding bells 16, 17 on the tong reins, places the button end 46 of the tongs in position in line with and above the draw chain 8 in readiness to be engaged by the next hook 14 on the chain 8 that appears on the upper face of the draw bench as the chain travels around the sprocket wheel 7 on the furnace end of the bench.

As soon as the first pipe skelp has been drawn and the end of the tongs in the grasp of a forked hook of the draw chain reaches the rear end of the draw bench, the tongs are manually disengaged from the draw chain and are opened so as to release the welded pipe. The tongs are then placed on the tongs conveyer 39 on one side of the draw bench, which travels toward the front end of the bench and which returns the tongs to the front or furnace end of the draw bench into position to be again used by the welder, and the pipe is rolled sidewise to the pipe conveyer 40 on the other side of the draw bench. It will be apparent that with this apparatus the skelp are pulled through the welding bells in a vertical plane which is at a slight angle to the length of the draw chain in welding the skelp into pipes, and that as soon as a pipe drawing operation commences the way will be clear for the welder to attach a pair of tongs to another pipe skelp and to a hook 14 on the draw chain 8 and commence the forming or welding of another pipe, and that a plurality of pipes may be simultaneously drawn in offset relation by my improved apparatus.

Figure 3:
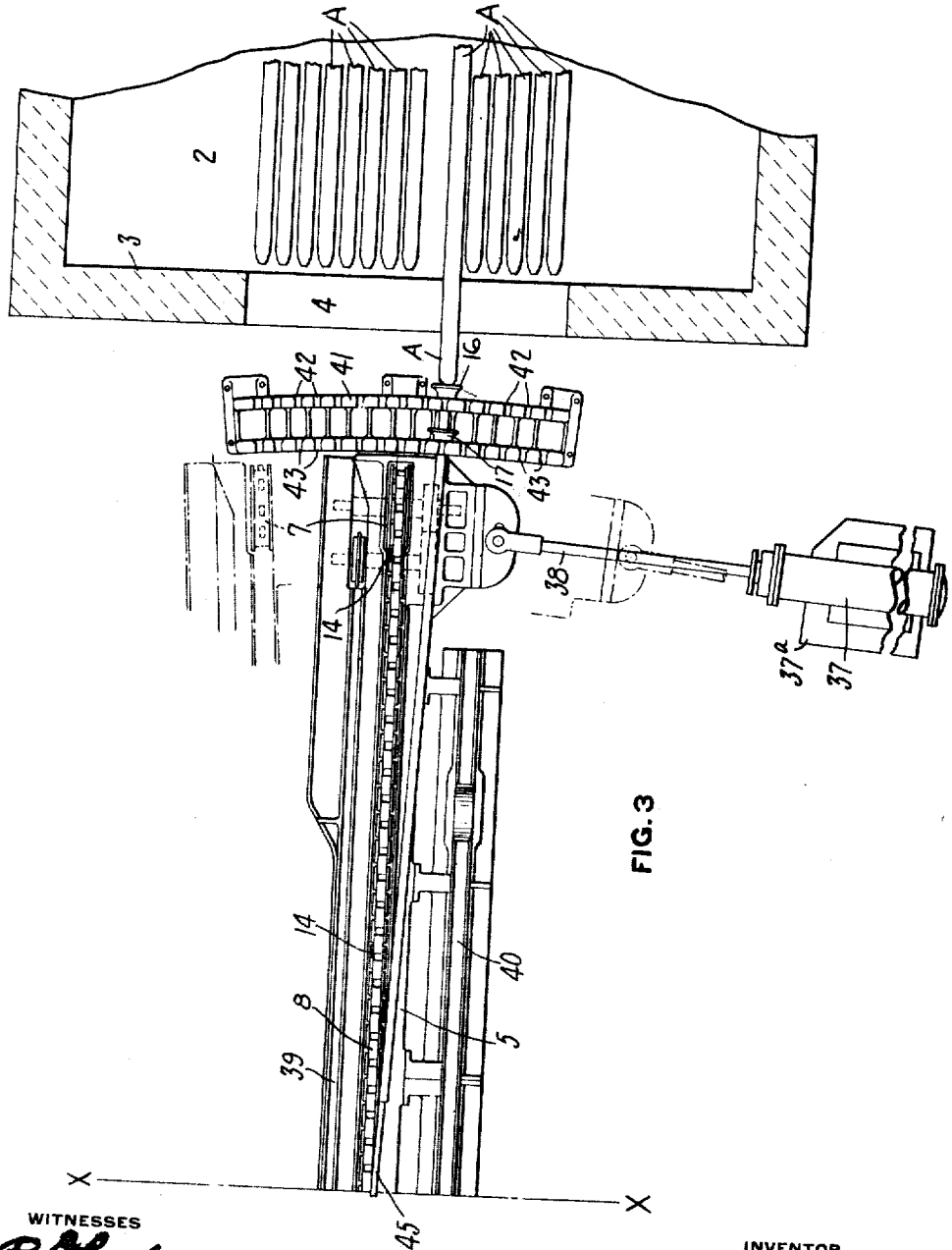
Fig. 3 is a plan, similar to that of Fig. 2, showing the front or furnace end of a modified form of draw bench made in accordance with my invention. A complete plan will be had by joining Figs. 1 and 3 on the lines X—X of these figures.

In practising my improved method with the apparatus of Figs. 3, 6, and 7, the steps will be the same as have been described, except that the draw bench 5 will be shifted after engagement of the tongs 45 with the hooks 14 on the draw chain to move the pipe being welded out of alinement with the direction of travel of the draw chain and bring another set of the bell holding slots 42, 43 into position in line with the direction of travel of the draw chain in readiness for the attachment of the pipe tongs and the commencement of another pipe drawing operation.

The advantages of my invention will be apparent to those skilled in the art. The provision of means whereby a plurality of pipes can be drawn simultaneously by a single draw chain reduces the time between the successive pipe drawing operations and avoids the delays heretofore necessary after the commencement of each pipe drawing operation to enable the pipe being drawn to be completed before the next pipe skelp is attached to the draw bench.

The apparatus is simple and is applicable for use with existing draw benches.

Many modifications may be made in the construction and arrangement of the apparatus forming part of my invention without departing from the invention. The method forming part of my invention may be carried out with apparatus other than that shown, and other changes may be made within the scope of the appended claims.

I claim:—

1. The method of making butt-weld pipe which consists in connecting one end of the heated pipe skelp to the traveling chain of a draw bench, and thereby pulling the skelp through a welding bell, and shifting the relative position of the draw chain and welding bell to thereby move the chain sidewise out of alinement with the axial center of said bell and into substantial alinement with another bell and to pull the skelp through said first bell in a path at an angle to the lengthwise center of the traveling draw chain in the welding operation.

2. The method of making butt-weld pipe which consists in operatively connecting a heated pipe skelp to the traveling draw chain of a draw bench, to draw the skelp through a welding bell, and then causing a relative sidewise movement of said bell and draw chain to thereby aline said chain with a second bell and to draw said skelp through said first named bell, in a path at an angle to the line of travel of the draw chain in the welding operation.

3. In the manufacture of butt-weld pipes, the steps consisting in attaching the pipe tongs to the traveling draw chain of a draw bench having a series of welding bell holders, after applying a welding bell to one of said holders, and shifting the position of the draw bench relative to the welding bell after attachment of the tongs to the draw chain to thereby draw the attached skelp through the welding bell in a path at an angle to the line of travel of the draw chain and to aline the draw chain with another bell holder in said series of holders.

4. Pipe drawing apparatus comprising a draw bench having an endless continuously moving draw chain thereon, a series of forked dogs having endless travel with the draw chain and adapted to engage the end of the tongs while the chain is traveling to pull the skelp through the welding bell, a welding bell, a bell support adapted to simultaneously hold a plurality of bells in pipe welding position, and means for relatively adjusting the draw bench and bell holder to move the bell when in welding engagement with a pipe skelp out of alinement with the traveling draw chain.

5. In a pipe drawing apparatus a draw bench, an endless draw chain having travel thereon, a bell holder at one end of the draw bench, skelp engaging tongs, means having endless travel with the draw chain adapted to engage the end of said tongs while the chain is traveling and pull the skelp through the welding bell, and means for causing a relative movement of the draw bench and bell holder to shift the position of the welding bell on the bell holder relative to the traveling draw chain after engagement of the bell with the skelp.

6. Pipe drawing apparatus having tongs by which the skelp is gripped and drawn through welding bells, comprising a draw bench having an endless chain, means for actuating said chain, means adapted to automatically engage with the tong reins to draw skelp gripped by the tongs lengthwise over the draw bench, a multiple welding bell holder having a plurality of bell holding slots, and means for causing a relative movement of the draw bench and bell holder to bring the draw chain in position opposite said bell holding slots.

7. Pipe drawing apparatus having tongs by which the pipe skelp is gripped and drawn through a welding bell, comprising a swinging draw bench arranged to travel at the front of the welding furnace, means for swinging the draw bench, and means at separated intervals on the draw chain adapted to automatically engage with the tong reins and draw pipe skelp gripped by the tongs lengthwise over the draw bench, said means being spaced on the draw chain at a distance less than the length of the pipe skelp, and means for relatively moving the draw bench and bell holder to shift the pipe being drawn out of the path of movement of the holding means on the draw chain.

8. In a pipe drawing apparatus, an endless moving draw chain, a series of forked dogs carried by said chain, a plurality of welding bells, and means associated with said chain and said bells whereby they may be moved relatively to permit of simultaneously drawing a plurality of pipes in offset relationship.

In testimony whereof I have hereunto set my hand.

JOHN SNEDDON.